Jan. 23, 1962 L. C. CANO 3,017,999
RECORD ALBUM RACK WITH IMPROVED HINGE
Filed April 20, 1960
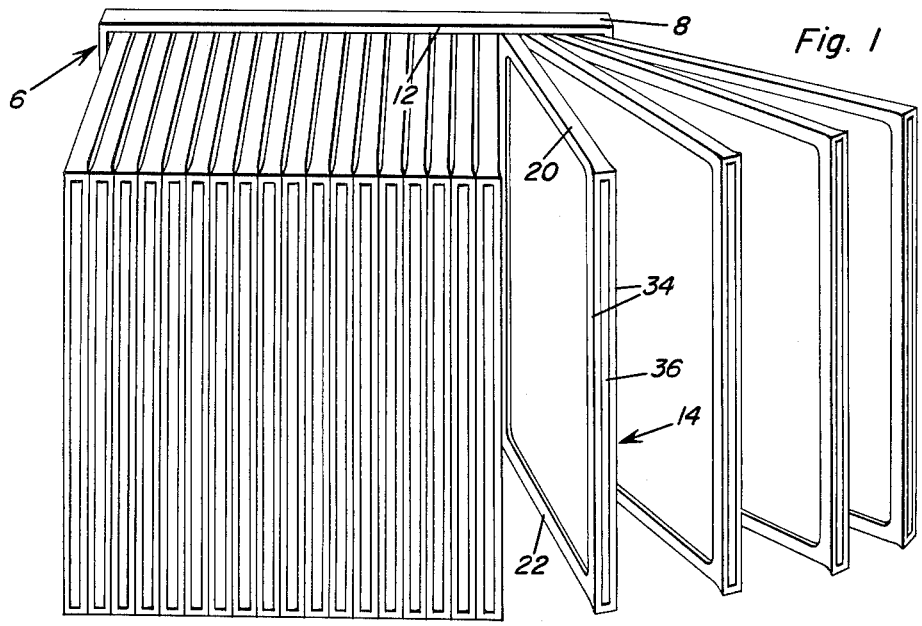
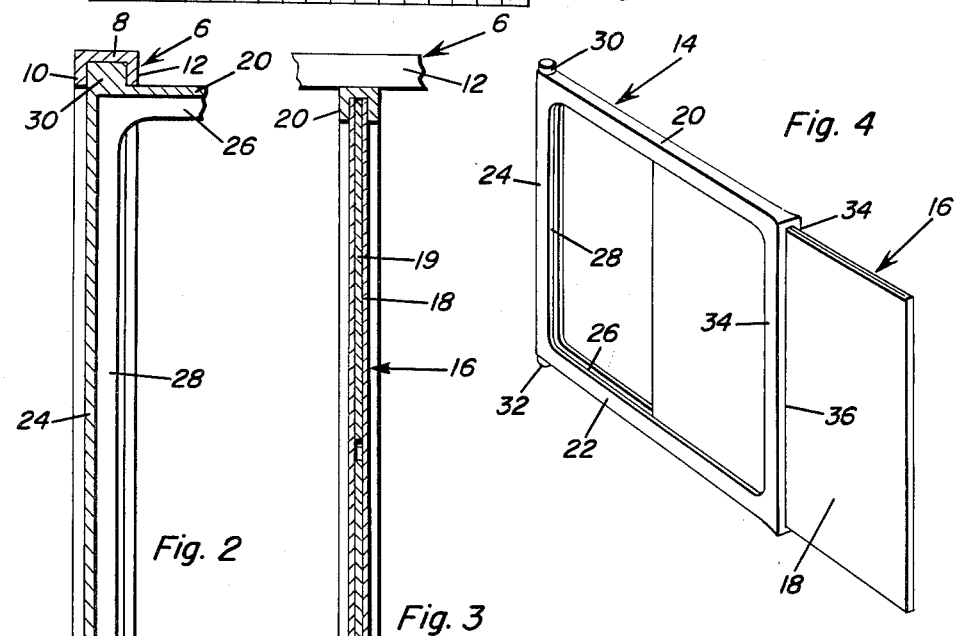
Luis Carlos Cano
INVENTOR.
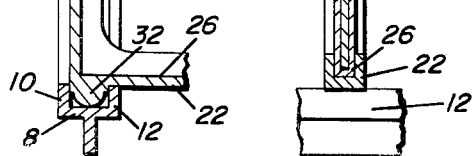

United States Patent Office 3,017,999
Patented Jan. 23, 1962

3,017,999
RECORD ALBUM RACK WITH IMPROVED HINGE
Luis C. Cano, Ave. de La Paz 659, Guadalajara, Jalisco, Mexico
Filed Apr. 20, 1960, Ser. No. 23,549
3 Claims. (Cl. 211—40)

The present invention relates to an improved systematizing holding and protecting rack which enables the owner thereof, in the home, or a record selling establishment to removably store phonograph albums therein.

More specifically, the instant concept has to do with simple, practical and economical frames and a combination and an association thereof resulting in a highly desirable rack construction which functions to protectively conserve phonograph records and jackets in which they are contained and which makes it a device which is not only possessed of the advantages briefly mentioned but will adequately serve the purposes for which it is intended.

To the end that the construction contemplated will comply with certain aims under advisement the form of the invention disclosed is characterized, generally speaking, by frame means the components of which may be manufactured from plastic, metal or any other suitable material looking toward protecting phonograph record albums and suitable for such purposes in that the desired protection is assured while, at the same time, providing an advanced structural adaptation which is attractive, efficient and capable of achieving the over-all desired results.

The invention also features a construction and an adaptation thereof which may be used not only atop a table or counter but may be suspended from a wall or other stationary vertical support and, indeed, is such that it may be installed in a sutiable compartment in a record cabinet or any handy cabinet that one might adopt as a housing therefor.

Then too, novelty is predicated on the fact that the rack has a capacity to permit the handling of a great number of records in a relatively small space, the selection of any desired record with the ease that the leaves of a book are turned without direct handling and protecting the records and jackets inasmuch as they do not rub against each other and facilitate the insertion and removal of a desired record, independently from each other through the opening in the front of the frame and without suffering any damage because the record and jacket are free from any squeezing or damaging pressure. Thus, the holding frames for each of the records may be regarded as individual protecting and storing compartments therefor.

It is known to this applicant that racks with individual holders for records are not broadly new. Therefore, it is an object of the instant invention to structurally, functionally and otherwise improve upon analogous prior art adaptations and, in so doing, to provide an over-all improved construction which will appeal to the manufacturing economies of manufacturers, to the prerequisites of good sale by retailers, and to users who are desirous of keeping their records systematically stored and listed for ready reference purposes.

It is also a matter of moment to take note of the fact that with the records stored in swingable hingedly mounted individual compartment-like frames adequate protection is afforded at all times and despite the over-all utility of the construction it is nevertheless possessed of balanced design and attractive from the standpoint of appearance.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in pespective of a phonograph record rack consturcted in accordance with the invention showing certain of the auxiliary movable frames swung to an open position.

FIG. 2 is a section on an enlarged scale showing the hinge means in particular.

FIG. 3 is a view observing FIG. 2 in a direction from right to left.

FIG. 4 is a view in perspective on a smaller scale for showing one of the record albums partly pulled out.

Briefly summarized, the invention is characterized by a flat base frame having coplanar upper and lower frame members channel-shaped in cross-section with their respective channels opening toward each other, and a slide-away record album holding frame marginally bordering the inserted record album and having axially alined outstanding upper and lower studs, said studs being rotatably keyed in their respective channels.

With reference to the drawing the base frame is a unit of general rectangular form and is denoted by the numeral 6 and the frame members instead of being L-shaped or of angle-iron construction as in my co-pending application filed April 20, 1960, Serial No. 23,548 are channel-shaped in cross-section. That is to say each member comprises a web 8 and flanges 10 and 12 defining marginal channels. Each auxiliary selector-type frame is denoted by the numeral 14 and as shown in FIG. 4 is of one-piece construction to accommodate the insertable and removable album 16. This album comprises a jacket (FIG. 3) containing the disk or record, the jacket denoted at 18 and the record or disk at 19. The three channel members of the frame 14 are designated as at 20, 22 and 24 and these several members are joined to provide channels as at 26 and 28 which communicate. The frame hinging means comprises a top stud-like pivot 30 and a lower one 32 and these components are in axial alignment and in fact are lined up with the channel member 24. Strip members 34 disposed in spaced parallelism at the front of the frame serve to connect the upper and lower frame members 20 and 22 and they cooperate with each other in defining a slot 36 between themselves which in turn defines the entrance to the channeling and retaining grooves for the insertable and removable album.

As is clear from the views of the illustrative drawing the auxiliary frames 14 are arranged side-by-side and hingedly mounted on the main frame much in the manner that leaves are bound in a book. In some instances the rack has been referred to as a book-type rack since the frames 14 may be "thumbed" like the pages or leaves of a book. This makes it easy to select and inspect the jackets on the records.

It is perhaps significant to mention that the main and auxiliary frames may be manufactured from a suitable grade of commercial plastic material, metal or any other suitable material primarily with the object in mind of storing the albums for protected selective use. One after having seen the device in use with the colorfully jacketed records will no doubt fully appreciate the appearance factors. Where a cabinet in the home is available and has a compartment or space of suitable size it is possible to prefabricate the rack so that it may be fitted properly into place and successfully used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed. It is understood that the frames may be of a cross-section and size to hold one or two or more record albums depending on varying merchandising and other requirements.

What is claimed as new is as follows:

1. A selector-type phonograph record album rack comprising a flat base frame including interconnected coplanar upper and lower frame members channel-shaped in cross-section with their respective channels opening toward each other, and a record album holding frame adapted to marginally border the inserted record album and having axially alined outstanding upper and lower studs, said studs being rotatably keyed in their respective channels, said holding frame being rectangular and providing left and right window-like sight openings, having top and bottom channel members providing channel-like tracks for the insertable and removable album, the outer ends of the side flanges of said top and bottom members being joined by strip-like connecting members spaced apart in parallel relationship and providing an album intake slot.

2. A selector-type phonograph record album rack comprising a flat base frame having coplanar upper and lower frame members channel-shaped in cross-section with their respective channels opening toward each other, and a slide-away record album holding frame having axially alined outstanding upper and lower studs, said studs being rotatably keyed in their respective channels, the upper stud being cylindrical in cross-section and of a length about equal to the depth of the channel in which it is pivotally keyed, the lower stud being substantially semi-spherical in form and also of a length corresponding to the depth of the channel in which it is removably keyed.

3. Means for protectively pocketing and holding a phonograph record album comprising, in combination, a holding frame generally rectangular having horizontal top and bottom coplanar spaced parallel frame members, the outer ends of the channels thereof being open, the side flanges being interconnected by vertical spaced parallel strip members defining a slot communicating with the open outer ends, a third frame member likewise channel-shaped in cross-section and vertically disposed and joining the cooperating inner ends of the top and bottom members together, the inner end of the web of the top channel member having an upstanding cylindrical mounting and hinging stud, the inner end of the web of the bottom channel member having a depending semi-spherical stud, said studs being axially alined with each other, and a base frame embodying interconnected frame members channel-shaped in cross-section, the upper and lower channels thereof being of a depth about equal to the length of said studs and the studs being pivotally seated in their respective channels.

References Cited in the file of this patent

UNITED STATES PATENTS

| | | |
|---|---|---|
| 1,251,253 | Lough | Dec. 25, 1917 |
| 1,421,391 | Bower | July 4, 1922 |
| 2,042,656 | Hake | June 2, 1936 |
| 2,220,189 | Wolters | Nov. 5, 1940 |
| 2,804,212 | Spitzig | Aug. 27, 1957 |